(12) United States Patent
Yamanaka et al.

(10) Patent No.: US 7,016,207 B2
(45) Date of Patent: Mar. 21, 2006

(54) POWER INVERTER

(75) Inventors: Katsutoshi Yamanaka, Fukuoka (JP);
Noritaka Koga, Fukuoka (JP);
Michihiko Zenke, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 100 days.

(21) Appl. No.: 10/482,387

(22) PCT Filed: Jun. 26, 2002

(86) PCT No.: PCT/JP02/06439

§ 371 (c)(1),
(2), (4) Date: Dec. 31, 2003

(87) PCT Pub. No.: WO03/005552

PCT Pub. Date: Jan. 16, 2003

(65) Prior Publication Data
US 2004/0174723 A1 Sep. 9, 2004

(30) Foreign Application Priority Data
Jul. 2, 2001 (JP) ............................. 2001-200843

(51) Int. Cl.
H02M 3/24 (2006.01)
H02M 7/5387 (2006.01)

(52) U.S. Cl. ........................ 363/98; 363/132; 363/50
(58) Field of Classification Search ................. 363/50, 363/34, 52, 56.03, 56.4, 157, 98, 132; 323/205, 323/207; 361/79, 88, 30, 86–89, 93
See application file for complete search history.

(56) References Cited

U.S. PATENT DOCUMENTS

| 5,608,595 A | * | 3/1997 | Gourab et al. ................. 361/79 |
| 5,910,892 A | | 6/1999 | Lyons et al. |
| 6,351,397 B1 | * | 2/2002 | Sawa et al. .................... 363/50 |

FOREIGN PATENT DOCUMENTS

| JP | 10-164854 A | 6/1998 |
| JP | 11-032426 A | 2/1999 |
| JP | 2000-102257 A | 4/2000 |
| JP | 2001-061283 A | 3/2001 |

* cited by examiner

Primary Examiner—Rajnikant B. Patel
(74) Attorney, Agent, or Firm—Sughrue Mion, PLLC

(57) ABSTRACT

In a power converting apparatus including a capacitor connected in series which serves to divide a DC voltage, and a PWM inverter bridge for converting the DC voltage into an AC phase voltage having three electric potentials of a positive voltage, a negative voltage and an intermediate voltage in a plurality of phases, a zero voltage period generator (11) is switched by signal switching devices (5 to 10) when a load current reaches a first overcurrent level based on the detection of an overcurrent detector (12), and there is provided a zero voltage period having an intermediate voltage in which output phase voltages having all phases of the power converting apparatus become the intermediate voltages, thereby carrying out a current limitation. With an inexpensive structure, consequently, a rapidly increased current in an inverter can be instantaneously suppressed at time of the detection of an overcurrent.

7 Claims, 13 Drawing Sheets

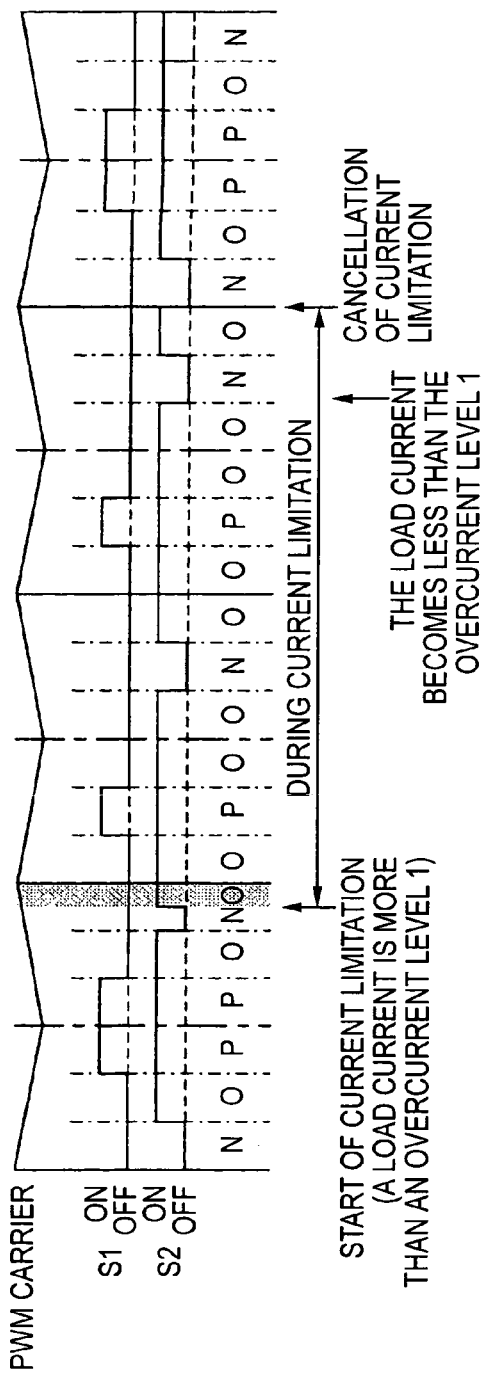

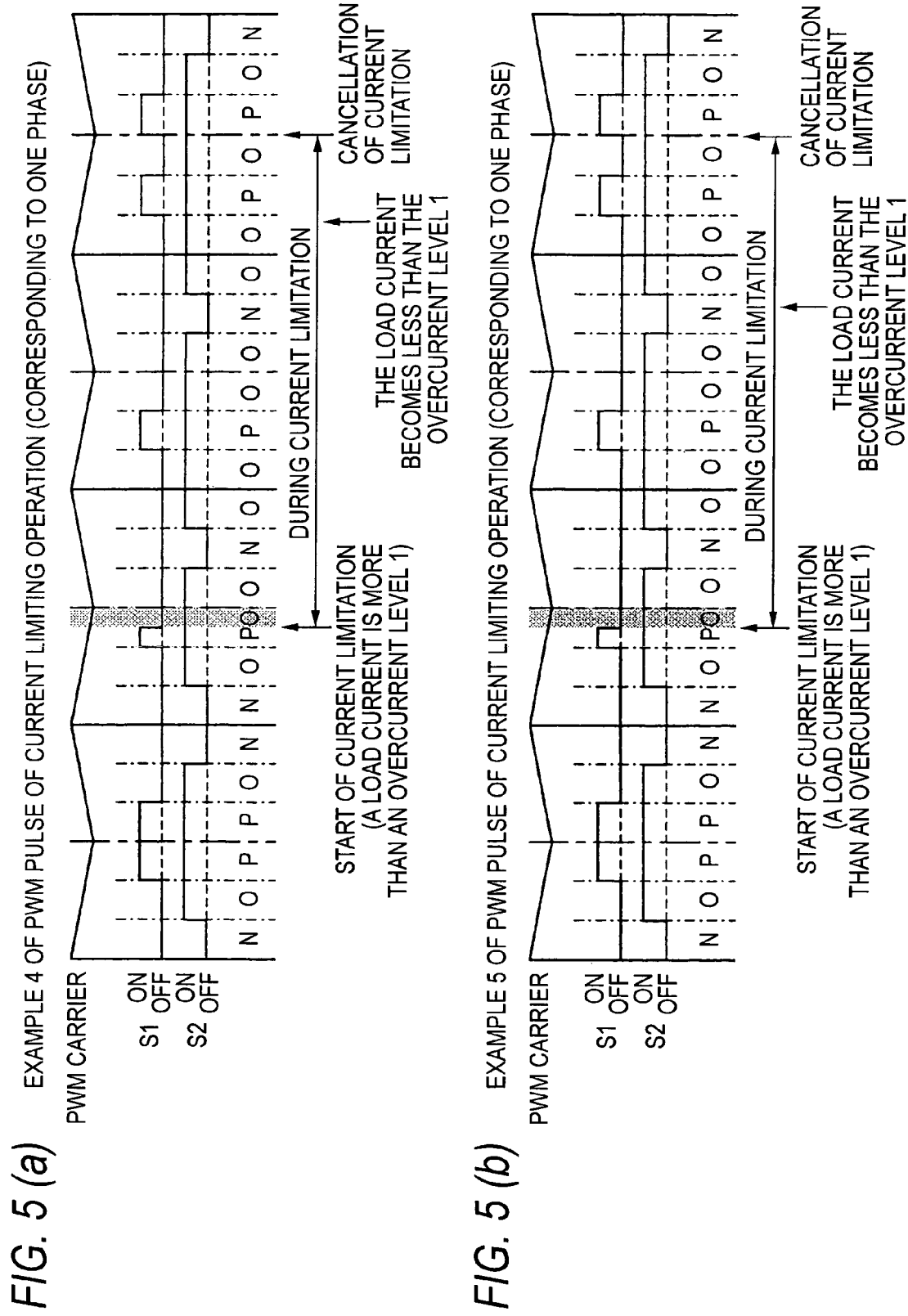

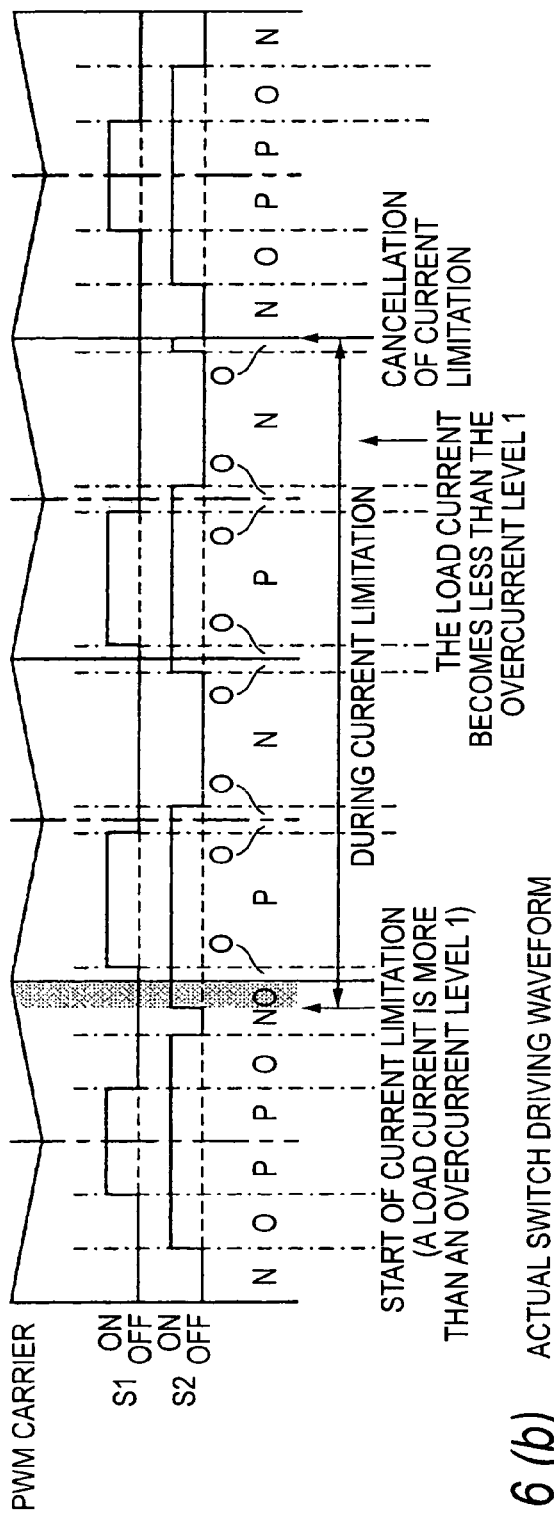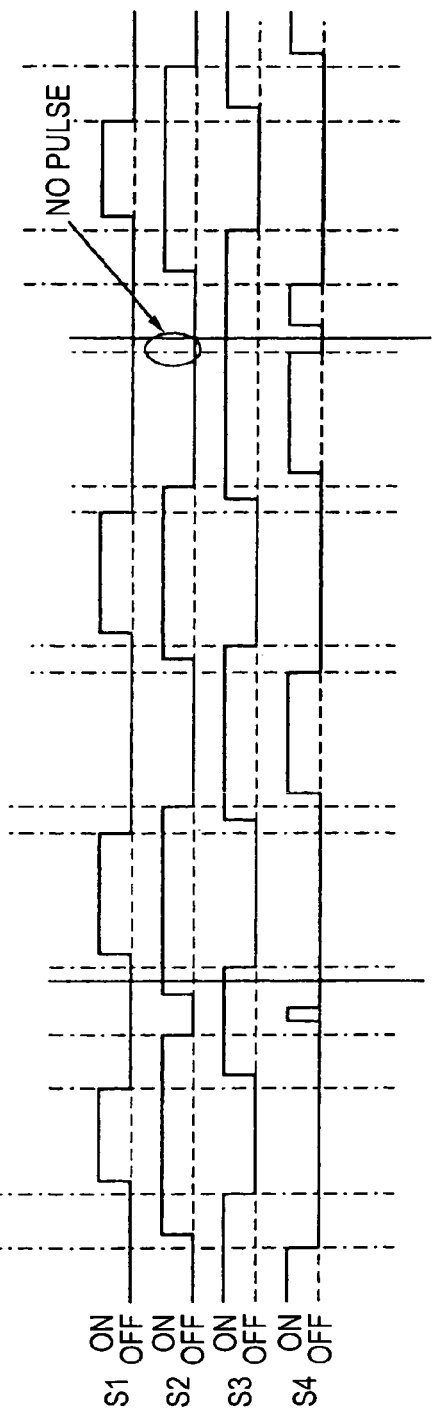
FIG. 6(a) EXAMPLE 6 OF PWM PULSE OF CURRENT LIMITING OPERATION (CORRESPONDING TO ONE PHASE)
FIG. 6(b) ACTUAL SWITCH DRIVING WAVEFORM

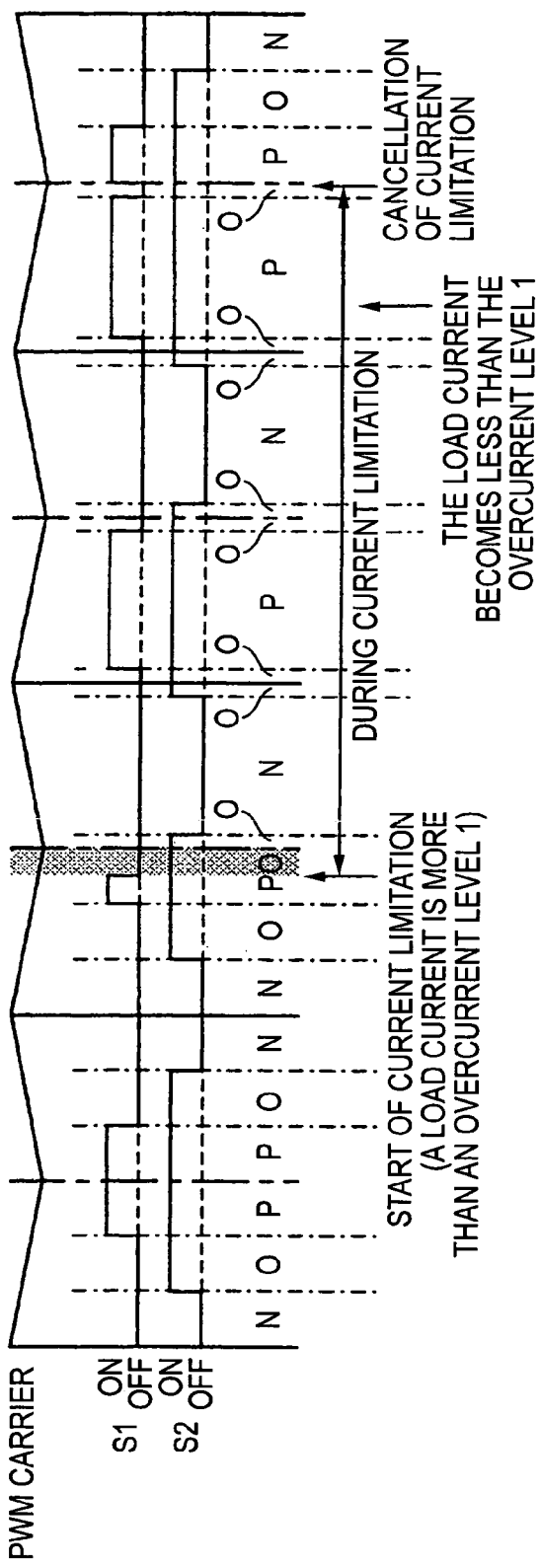
FIG. 7 (a) EXAMPLE 7 OF PWM PULSE OF CURRENT LIMITING OPERATION (CORRESPONDING TO ONE PHASE)
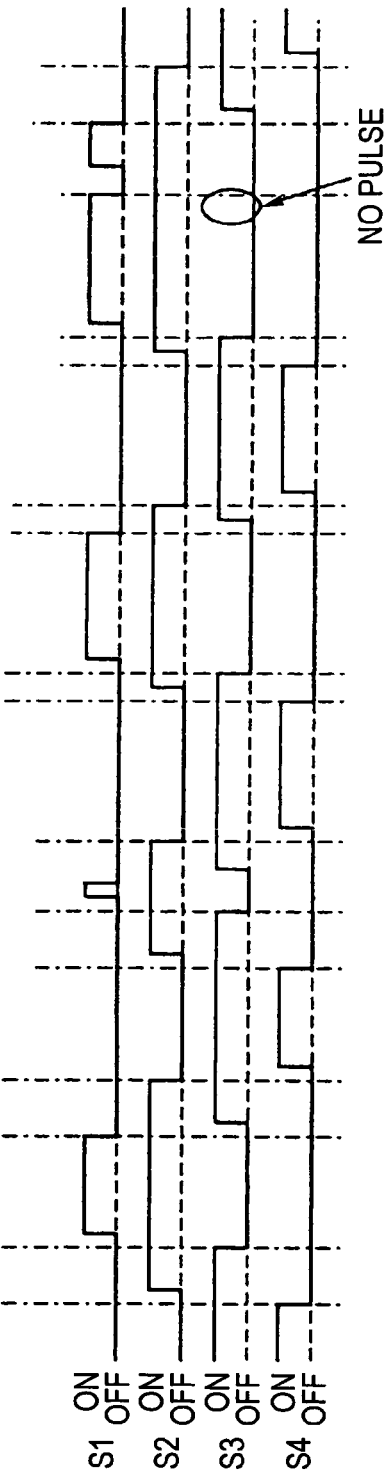
FIG. 7 (b) ACTUAL SWITCH DRIVING WAVEFORM

POWER INVERTER

TECHNICAL FIELD

The present invention relates to an inverter servo drive for carrying out a variable speed driving operation for a motor and a power converting apparatus for system interconnection.

BACKGROUND ART

As shown in FIG. 10, an inverter of a three-phase neutral clamp type has such a structure that an inverter bridge having four switch elements and two clamp diodes per phase is used and an intermediate voltage divided equally by a capacitor having a DC bus voltage connected in series can be output to a phase output terminal. When S1 and S2 are ON and S3 and S4 are OFF in four switch elements connected in series, a phase output terminal voltage is positive. When the S3 and the S4 are ON and the S1 and the S2 are OFF, the phase output terminal voltage is negative. When the S2 and the S3 are ON and the S1 and the S4 are OFF, the phase output terminal voltage is an intermediate voltage. Accordingly, the S1 and S3 and the S2 and S4 are not turned ON at the same time. In many cases, therefore, the ON/OFF signal of the S2 is obtained by inverting the signal of the S1 and that of the S4 is obtained by inverting the signal of the S2.

However, a switching element and a driving circuit have a delay. There is a possibility that respective switches might be simultaneously turned ON by the delay and a large short-circuit current might flow to the switch element to be broken. In consideration of the delay, therefore, a dead time generating circuit shown in FIG. 11 is provided in a controller and the actual ON/OFF signal of the switch element is always provided with a dead time period to be a simultaneous OFF period shown in FIG. 12. APWM generator in FIG. 11 generates PWM pulse signals having respective phases (U1, U2, V1, V2, W1, W2) based on a command of an output voltage created in the controller. In the inverter of the three-phase neutral clamp type, the PWM pulse signal is to be generated by a set of the S1 and S3 and a set of the S2 and S4. For this reason, each of the PWM pulse signals makes a signal such that the S1 and S3 and the S2 and S4 are not turned ON at the same time by an inverting circuit, a delay circuit and an AND gate, and each of the switches is driven in response to an ON/OFF signal so that the switch element can be prevented from being short-circuited. Also in the case in which a load current is equal to or larger than a current which can be caused to flow by the switch element, moreover, there is a possibility that the switch element might be broken. For this reason, it is necessary to provide a protecting device for detecting a current flowing to a switch element and turning OFF the switch to carry out a stop.

Such a protecting method has been proposed in JP-A-10-164854 and JP-A-11-32426.

FIG. 13 is a diagram showing the structure of a power converter disclosed in the JP-A-10-164854. Currents flowing to switching elements 3A to 3D are monitored by short-circuit detecting and breaking circuits 5A and 5B and short-circuit detecting circuits 6A and 6B respectively, thereby detecting a power short-circuit and a load current abnormality. When the abnormality is detected, the switching elements 3A and 3D are turned OFF in a later timing than a normal timing in accordance with the breaking operations of the short-circuit detecting and breaking circuits 5A and 5B and a gate signal sent from a gate control section 16, and then, one of the switching elements 3B and 3C is turned ON and the other is turned OFF in a later timing than the normal timing.

However, a processor is generally used for a controller for controlling an inverter to carry out a control by software. Therefore, a control for suppressing a load current cannot be carried out by the software of the controller on such a condition that the load current rapidly becomes an overcurrent in a short time as in a PWM cycle. For this reason, as for the rapid increase in the load current, the load current is to be suppressed at a high speed or the switching of the inverter is to be stopped without using a processor.

The JP-A-10-164854 and the JP-A-11-32426 have proposed a method of safely stopping switching without breaking the switch element of the inverter in the overcurrent. However, there have been problems in that a rapidly increased load current cannot be controlled and a special delay circuit and a circuit for carrying out a complicated ON/OFF operation are required for the driving signal system of the switch element.

DISCLOSURE OF THE INVENTION

Therefore, it is an object of the invention to provide an inexpensive and safe power converting apparatus capable of reliably suppressing a rapidly increased current instantaneously with such a simple structure as comprising a switching device and a PWM pattern generator without need of a special delay circuit or a complicated circuit.

In order to attain the object, a first aspect of the invention is directed to a power converting apparatus comprising a capacitor connected in series which serves to divide a DC voltage, a positive side main switching element and a positive side auxiliary switching element which have three electric potentials for setting the DC voltage to be a positive voltage, a negative voltage and an intermediate voltage by utilizing a node of the capacitor, and are inserted between the positive voltage side and an output terminal connected to a load and are connected to each other in series, a negative side main switching element and a negative side auxiliary switching element which are inserted between the negative voltage side and the output terminal and are connected to each other in series, a clamp diode connected between the intermediate voltage point and a node of the positive side main switching element and the positive side auxiliary switching element and between the intermediate voltage point and a node of the negative side main switching element and the negative side auxiliary switching element, and a free wheel diode which is connected in parallel with each of the switching elements, and having, in a plurality of phases, a PWM inverter bridge for converting the DC voltage into an AC phase voltage having three electric potentials, wherein there is provided a zero voltage period having an intermediate voltage in which output phase voltages having all phases of the power converting apparatus become the intermediate voltage when a load current reaches a first overcurrent level.

Moreover, a second aspect of the invention is directed to the power converting apparatus according to the first aspect of the invention, wherein three periods having a positive zero voltage period in which the output phase voltages having all the phases of the power converting apparatus become the positive voltage, a negative zero voltage period in which the output phase voltages having all the phases of the power converting apparatus become the negative voltage, and a zero voltage period having the intermediate voltage are selected and output alternately after the zero voltage period 1.

Furthermore, a third aspect of the invention is directed to the power converting apparatus according to the second aspect of the invention, wherein a transition from the positive zero voltage period to the negative zero voltage period and a transition from the negative zero voltage period to the positive zero voltage period are prohibited.

Moreover, a fourth aspect of the invention is directed to the power converting apparatus according to the first aspect of the invention, wherein a reset to a normal PWM pulse is carried out when a load current is more than the first overcurrent level and is then less than the first overcurrent level.

Furthermore, a fifth aspect of the invention is directed to the power converting apparatus according to the fourth aspect of the invention, wherein a zero voltage period having the intermediate voltage is always output immediately before the normal PWM pulse is output.

Moreover, a sixth aspect of the invention is directed to the power converting apparatus according to the fifth aspect of the invention, wherein a time of the zero voltage period having the intermediate voltage to be output immediately before the output of the normal pulse is set to be equal to or shorter than a dead time.

Furthermore, a seventh aspect of the invention is directed to the power converting apparatus according to any of the fourth to sixth aspects of the invention, wherein a pattern of the normal PWM pulse after the reset is switched corresponding to a PWM pulse when the load current reaches the first overcurrent level.

Referring to such a power converting apparatus, first of all, the PWM pulse will be described by taking a general three-phase two-level PWM inverter as an example. As shown in FIG. 8 of FIGS. 8 and 9 to be explanatory diagrams showing a zero voltage vector, the PWM pulse usually compares one triangular-wave carrier with command voltages A, B and C having three phases (U, V, W), thereby creating PWM pulses having respective phases. In the drawing, On, Op, a and b represent the names of output voltage vectors.

On the other hand, P, N and O indicate a switch state in which each vector is converted to ON/OFF of the switch element, P indicates a switch state in which the phase output terminal of an inverter is connected to a positive bus, N indicates a switch state in which the same phase output terminal is connected to a negative bus and O indicates a switch state in which the same phase output terminal is connected to a neutral conductor, and PA, PB and PC indicate PWM pulse outputs having respective phases (U, V, W).

Moreover, vectors On and Op indicate a state in which a line voltage short-circuiting the U, V and W phases outputs a zero voltage vector (a zero voltage vector), Op indicates a state in which three switches on a positive bus side are ON, and On indicates a state in which three switches on a negative bus side are ON.

When the zero voltage vector is output, a voltage applied to a load is zero so that a load current is decreased. If a potential difference between the phases is forcibly set to be zero in an overcurrent, accordingly, a motor current is decreased so that an output current can be limited.

While the example of the three-phase and two-level inverter has been described above, a three-phase and three-level inverter may be used. If the zero voltage period generator instantaneously turns OFF the S1 having each phase and turns ON the switch state of the S2 in a full zero state to set a potential difference between the phases (U, V, W) to be zero and to set a voltage applied to a load to be zero when the overcurrent of the inverter is detected, a surge voltage applied by switching is also lessened, a load current is decreased and an overcurrent can be suppressed instantaneously.

BRIEF DESCRIPTION OF THE DRAWINGS

FIG. 4 is a diagram showing a PWM pulse according to a third embodiment of the invention, FIG. 5 is a diagram showing the case in which the current limitation operating point of the PWM pulse illustrated in FIG. 4 is different, FIG. 6 is a diagram showing a PWM pulse according to a fourth embodiment of the invention, FIG. 7 is a diagram showing the case in which the current limitation operating point of the PWM pulse illustrated in FIG. 6 is different.

Figure 1:
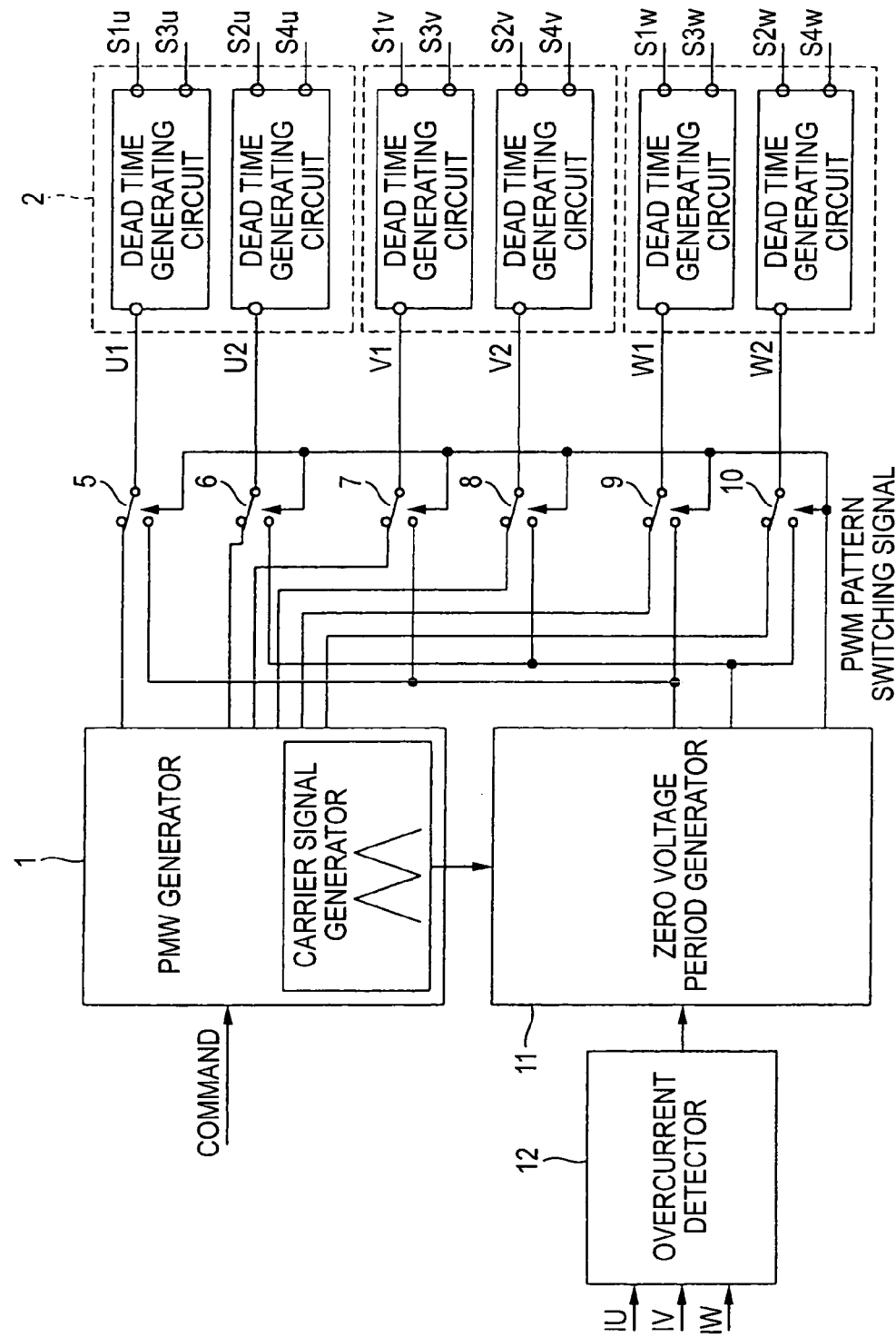
FIG. 1 is a block diagram showing a power converting apparatus according to a first embodiment of the invention.

In the drawings, 1 denotes a PWM pulse generator, 2 to 4 denote a dead time generating circuit block, 5 to 10 denote a switching device, 11 denotes a zero voltage period generator, and 12 denotes an overcurrent detector.

BEST MODE OF CARRYING OUT THE INVENTION

Next, a first embodiment of the invention will be described with reference to the drawings.

FIG. 1 is a block diagram showing a power converting apparatus according to the first embodiment of the invention.

Figure 2:
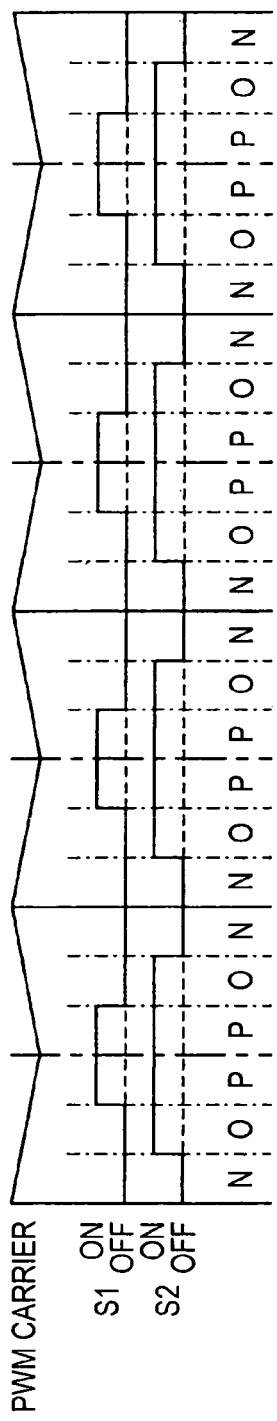
FIG. 2 is a diagram showing a PWM pulse illustrated in FIG. 1.
Figure 2:
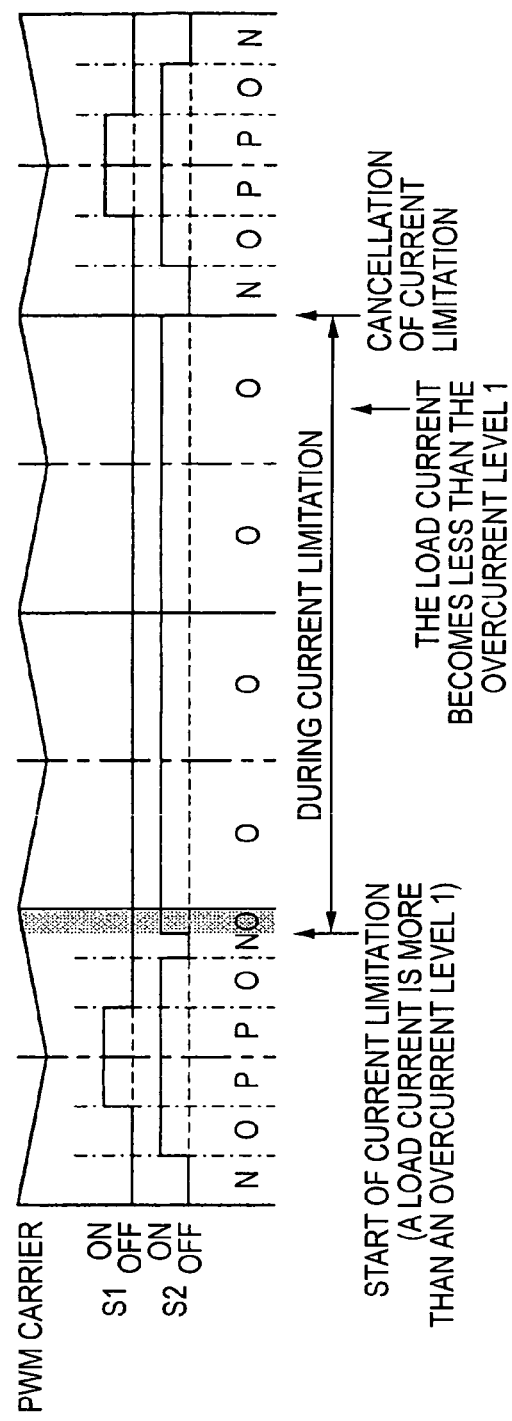

FIG. 2 is a diagram showing a PWM pulse illustrated in FIG. 1.

In FIG. 1, 1 denotes a PWM signal generator which generates a PWM pulse by a comparison of a triangular wave carrier with a voltage command or a calculation.

Numerical references 2 to 4 denote the same dead time generator as that in the conventional art, which inverts PWM pulses (U1, U2, V1, V2, W1, W2) and outputs ON/OFF signals S1$u$ to S4$w$ of a switch element through a delay circuit and an AND gate to each switch element, respectively. Numerical references 5 to 10 denote a signal switching device of the PWM signal generator 1 and a zero voltage period generator which switches the PWM pulse signal by a PWM pattern switching signal. Numerical reference 11 denotes the zero voltage period generator which outputs a zero voltage to be an intermediate voltage in place of the PWM pulse. 12 denotes an overcurrent detector such as a current detector.

The overcurrent detector 12 fetches currents having U, V and W phases of an inverter output and the current of the inverter monitors an overcurrent level 1 (which is preset), and a signal sent from a comparator (not shown), indicating whether or not the overcurrent level 1 is exceeded, is transmitted to the zero voltage period generator 11. The zero voltage period generator 11 turns OFF the signals U1, V1 and W1 and turns ON the signals U2, V2 and W2, and generates a zero voltage signal setting each phase voltage to be an intermediate voltage.

Next, an operation will be described.

In the first embodiment, the zero voltage period generator 11 previously outputs a zero voltage signal having an intermediate voltage and instantaneously switches the signal switching devices 5 to 10 from the signal of the PWM signal generator 1 to that of the zero voltage period generator 11 upon receipt of a signal sent from the overcurrent detector 12. In order to cause the voltage having each phase to be equal for a zero voltage period, it is preferable that the zero voltage period generator 11 should output only S1 and S2 signals having the respective phases. In the case in which the current of the inverter flows in a large amount, thus, a voltage applied to the inverter becomes zero when an output line voltage is instantaneously set to be a zero voltage by hardware. Consequently, a load current is decreased so that an overcurrent can be suppressed.

Moreover, a zero potential to be output is set to be an intermediate voltage for each phase. Therefore, there is neither a situation switching from a state in which the switch elements S1 and S2 are simultaneously turned ON to a state in which they are simultaneously turned OFF nor a situation switching from a state in which S3 and S4 are simultaneously turned ON to a state in which they are simultaneously turned OFF. Consequently, it is possible to obtain an advantage that a surge voltage applied to the switch element and the load is reduced.

In the case where an overcurrent suppressing operation is carried out and a current is thereafter decreased to be less than the overcurrent level 1, the zero voltage period generator 11 monitors the signal of the carrier signal generator of the PWM generating section 1 and the signal of the overcurrent detector 12, and, at time of the next PWM pattern being updated, it cancels the overcurrent suppressing operation so as to output a normal PWM pattern and to continuously carry out an operation. Consequently, it is possible to alleviate a shock and a surge voltage which are caused by switching the PWM pattern, thereby performing a safe load driving operation.

The operation will be specifically described with reference to FIG. 2. Referring to a PWM pattern in FIG. 2, FIG. 2(a) showing a PWM pattern in a normal state is compared with FIG. 2(b) showing an example of a PWM pattern in the overcurrent suppressing operation according to the first embodiment. FIG. 2 illustrates only a PWM pattern corresponding to one phase. During a current limitation, all phases output the same voltage. A triangular wave to be generally used as a PWM carrier of the carrier signal generator provided in the PWM generator 1 will be taken as an example. Moreover, there is conceptually shown that a cycle of the vertex and the lowest point of the PWM carrier is a half of the PWM cycle and an update point of the PWM pattern.

The PWM pulse is represented as N, O and P of a vector mode. P indicates a state in which the S1 and the S2 are ON and the S3 and the S4 are OFF, N indicates a state in which the S3 and the S4 are ON and the S1 and the S2 are OFF, and O indicates a state in which the S2 and the S3 are ON and the S1 and the S4 are OFF. During a current limitation, the S1 is OFF for all phases and the S2 is ON for all the phases. A zero voltage output for setting a switch state to be a full-phase O state is obtained. When the current limitation is cancelled, moreover, a reset to the same (NOPPON) normal PWM pattern output as that in FIG. 2(a) is carried out.

Next, a second embodiment of the invention will be described with reference to the drawings.

Figure 3:
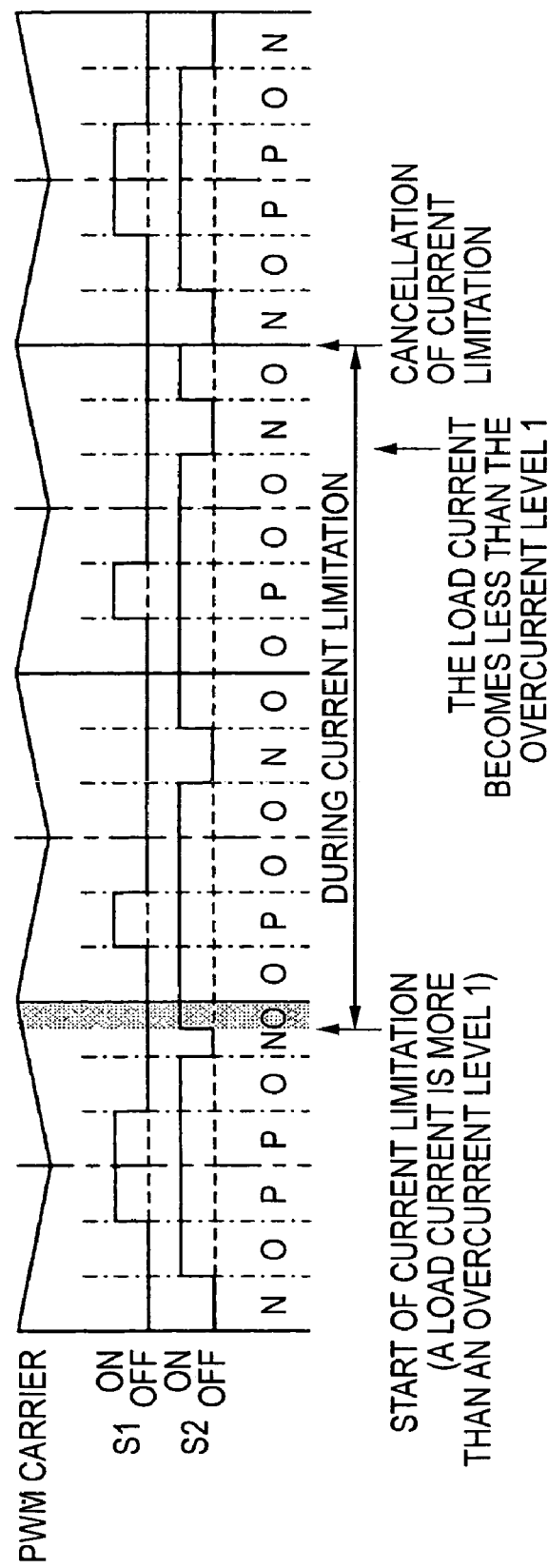
FIG. 3 is a diagram showing a PWM pulse according to a second embodiment of the invention.
Figure 8:
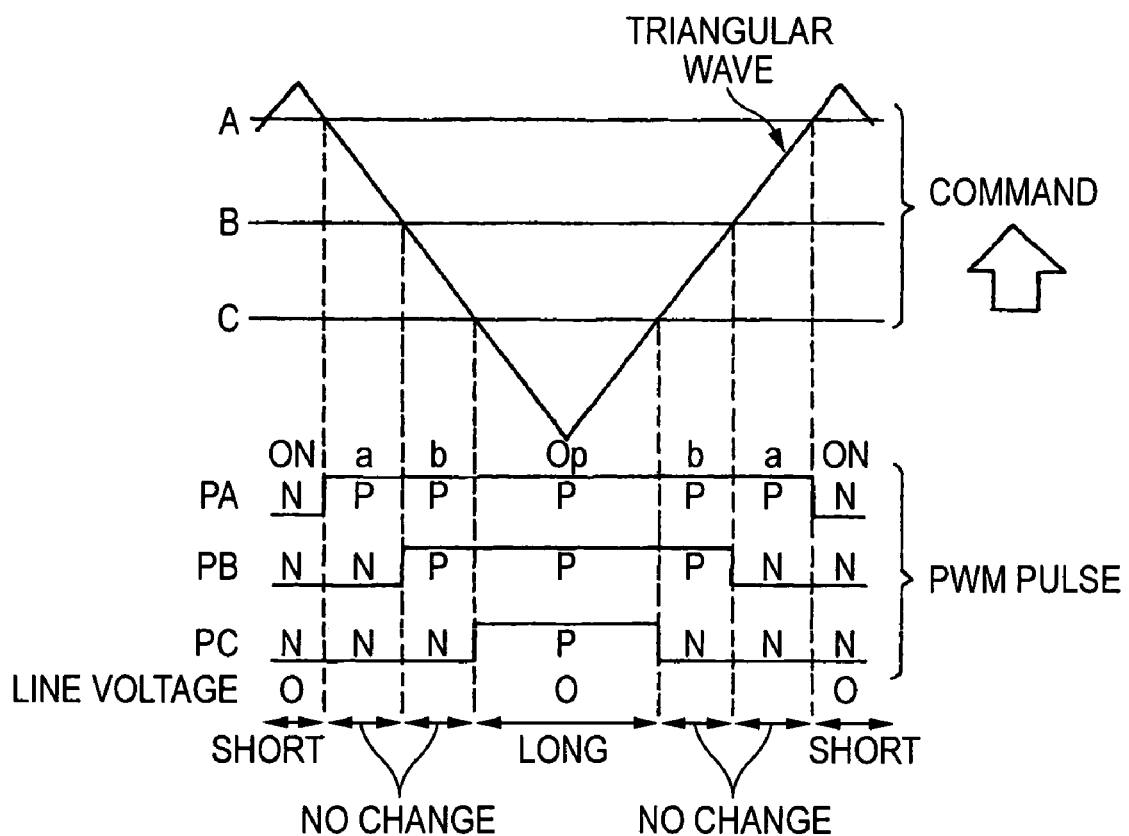
FIG. 8 is an explanatory diagram showing a PWM pulse according to the invention.
Figure 9:
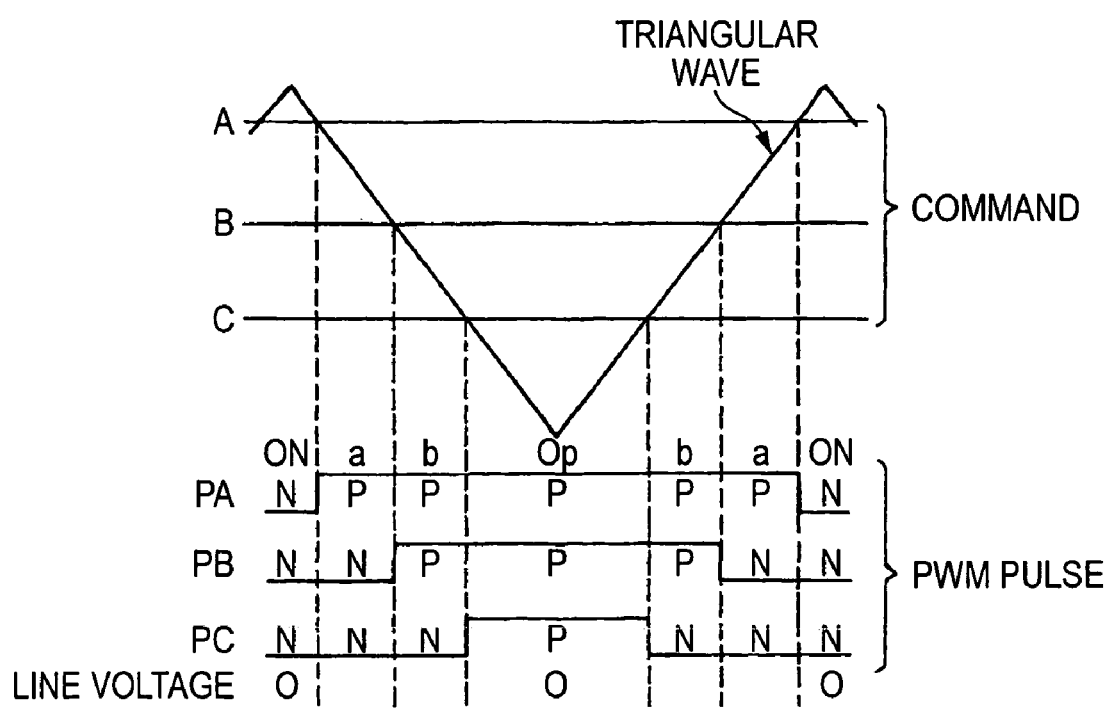
FIG. 9 is a diagram showing the case in which the voltage command of the PWM pulse illustrated in FIG. 8 is shifted.

FIG. 3 is a diagram showing a PWM pulse according to the second embodiment of the invention.

In the second embodiment, the block diagram of FIG. 1 is commonly applied to the embodiment described above. A zero voltage period generator 11 once sets a voltage having each phase to be an intermediate voltage, and sequentially switches all phases in order of an intermediate voltage—a positive voltage—the intermediate voltage, and the intermediate voltage—a negative voltage—the intermediate voltage (OPO, ONO) during a current limitation after a next PWM pattern update, and outputs them. Consequently, there is no switching into the positive voltage—the negative voltage (PN) and the negative voltage—the positive voltage (NP). Therefore, there is neither switching from a state in which switch elements S1 and S2 are simultaneously turned ON to a state in which they are simultaneously turned OFF nor switching from a state in which S3 and S4 are simultaneously turned ON to a state in which they are simultaneously turned OFF. Thus, it is possible to obtain an advantage that a surge voltage applied to the switch element and a load can be reduced.

FIG. 3 shows an example of the PWM pattern (corresponding to one phase). Although FIG. 3 illustrates only the PWM pattern for one phase, all phases output the same voltage during a current limitation. In the embodiment described above, all the phases are set to be the intermediate voltage (the S1 and the S4 are turned OFF, and the S2 and the S3 are turned ON) during the current limitation. Therefore, there is a possibility that a load current exceeding an overcurrent level 1 might continuously flow in the switch element S2 or S3 and the switch element S2 or S3 might be broken due to heat generated by a conduction loss. In the second embodiment, however, the load current flows in the S2 or S3 with switching. Consequently, the conduction loss is decreased so that the switch element can be prevented from being broken.

Moreover, it is also possible to carry out an operation for carrying out switching in order of the intermediate voltage—the positive voltage—the intermediate voltage or the intermediate voltage—the negative voltage—the intermediate voltage from the time immediately after the start of the current limitation to the next PWM pattern being updated, in the case where a zero voltage period for the intermediate voltage is output from a time immediately after the start of the current limitation to the next PWM pattern update.

Next, a third embodiment of the invention will be described with reference to the drawings.

FIG. 4 is a diagram showing a PWM pulse according to the third embodiment of the invention.

FIG. 5 is a diagram showing the case in which the current limitation operating point of the PWM pulse illustrated in FIG. 4 is different.

FIGS. 4 and 5 show a PWM pattern (corresponding to one phase) according to the third embodiment. Although FIGS. 4 and 5 illustrate only the PWM pattern for one phase, all phases output the same voltage during a current limitation. FIG. 1 is a common diagram.

In an example according to the third embodiment shown in FIG. 4, a current limiting operation is always cancelled on the vertex of a PWM carrier when a load current enters the current limiting operation in the case where the triangular wave of the PWM carrier is moved from the lowest point toward the vertex (FIG. 4a is the same as FIG. 3).

In FIGS. 4(b) and 4(a), time periods required from a time that an overcurrent detector 12 has a normal value again to a current limiting cancellation are different from each other.

In the example shown in FIG. 5, the current limiting operation is always cancelled on the lowest point of a PWM carrier when a load current enters the current limiting operation in the case in which the triangular wave of the PWM carrier is moved downward from a vertex.

Figure 10:
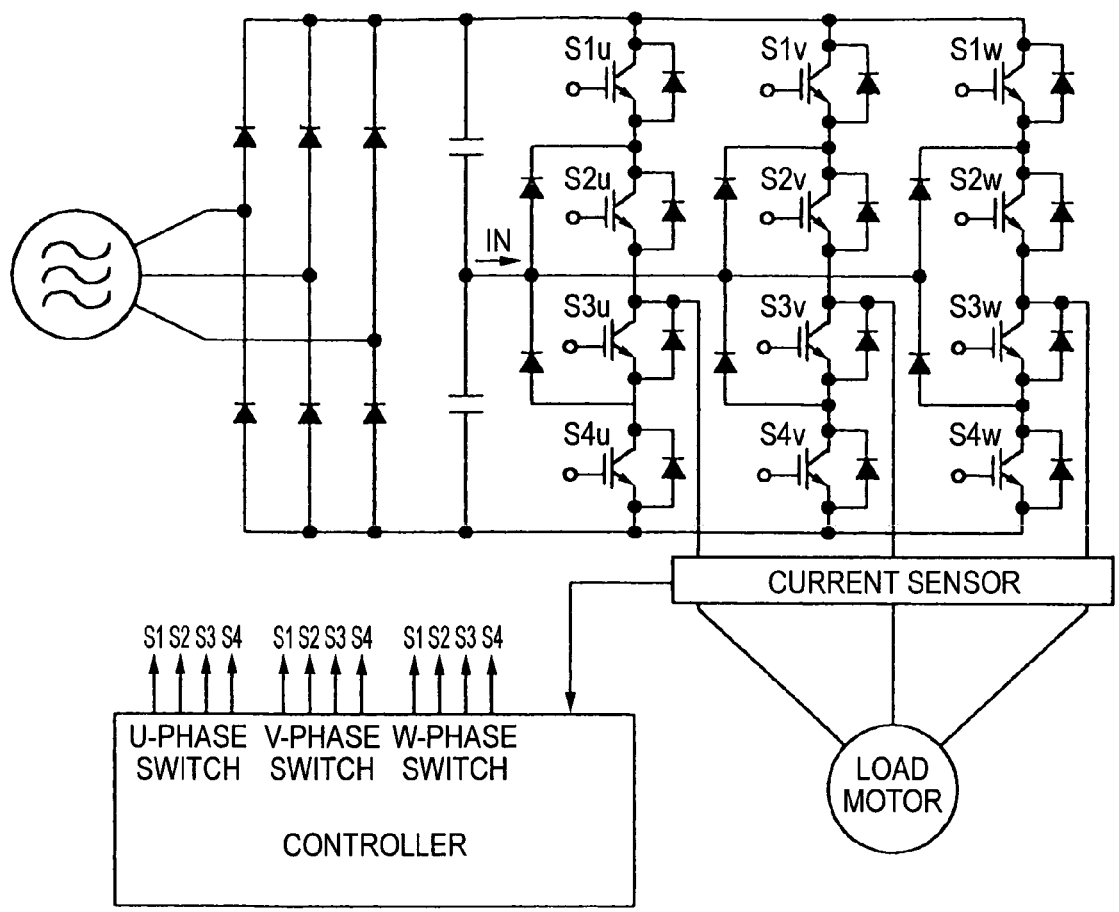
FIG. 10 is a circuit diagram showing a conventional inverter of a three-phase neutral clamp type.
Figure 11:
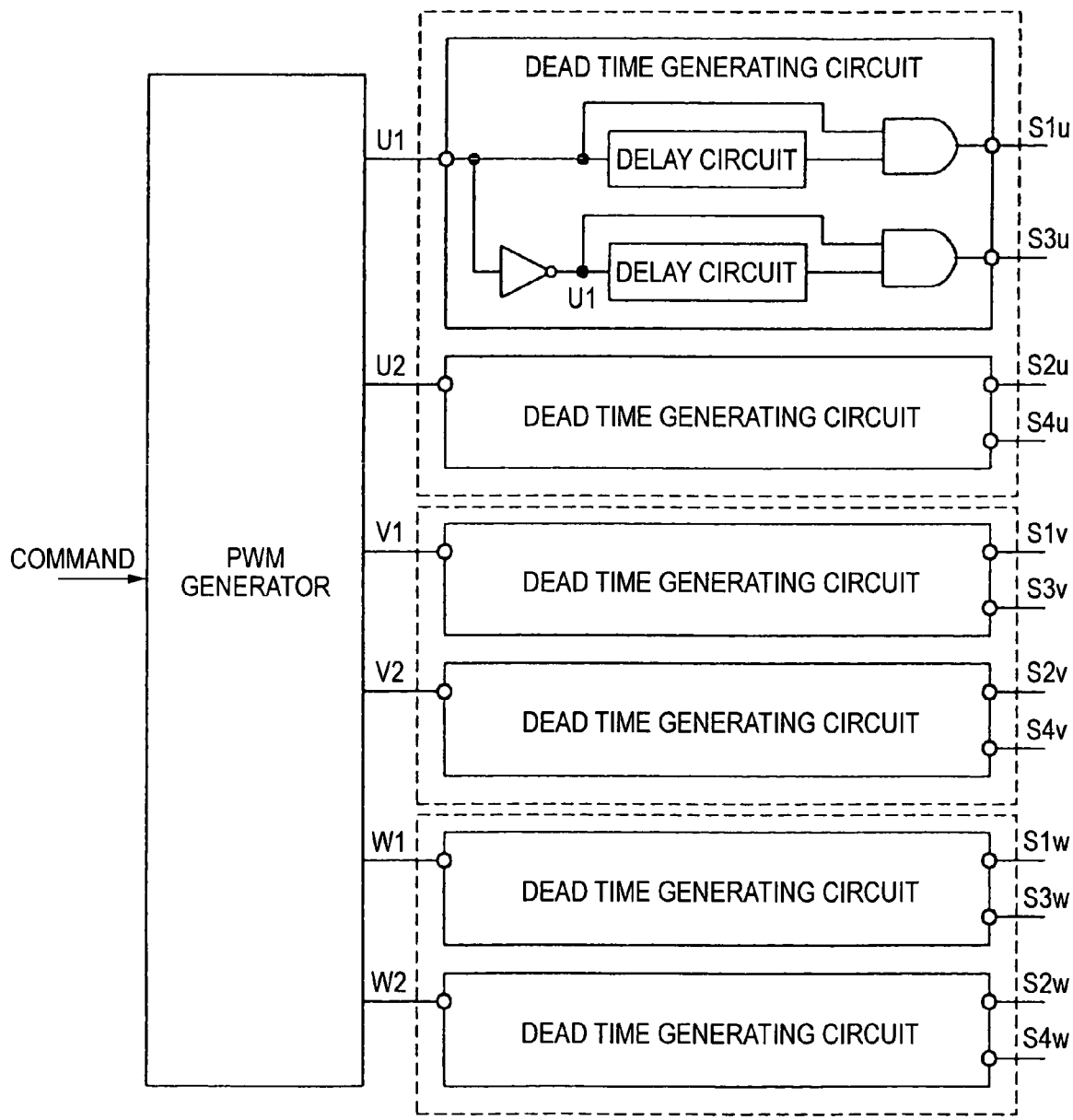
FIG. 11 is a block diagram showing a dead time generating circuit of the inverter illustrated in FIG. 10.
Figure 12:
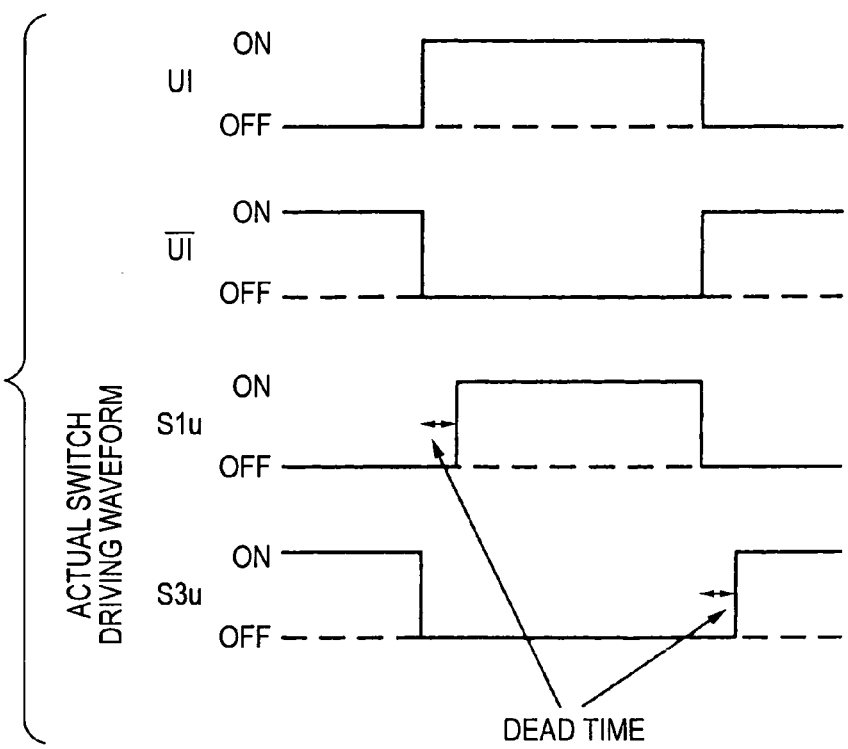
FIG. 12 is a diagram for explaining the concept of a dead time illustrated in FIG. 11.
Figure 13:
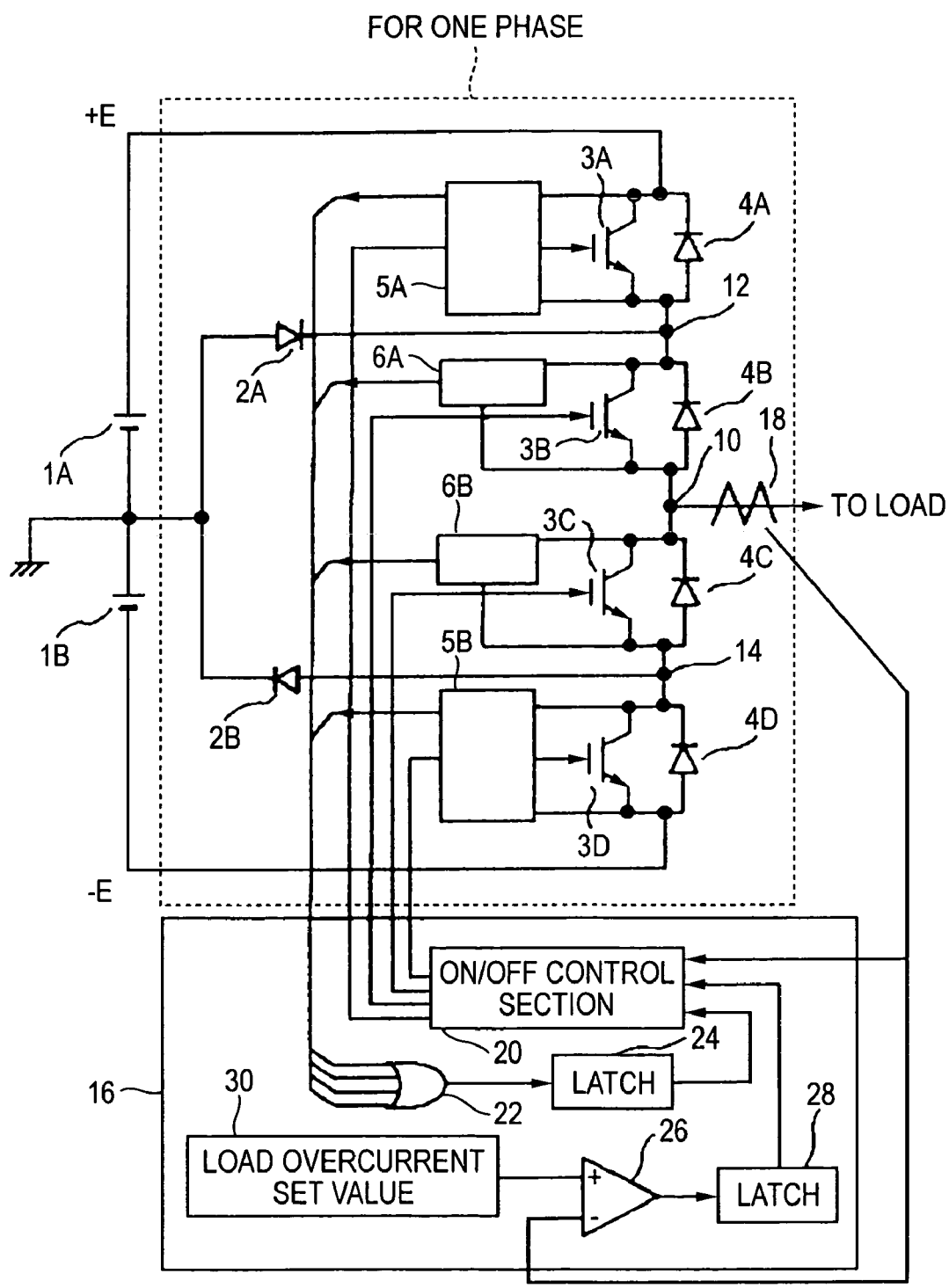
FIG. 13 is a diagram showing the structure of a well-known power converter.

For example, when the current limiting operation is cancelled on only the lowest point of the PWM carrier, the PWM pulse is stochastically output most greatly in a PWM pattern in the middle of a rise from the lowest point of the PWM carrier to the vertex on such a condition that the current limiting operation and the cancellation thereof are repeated. Consequently, the PWM pulse becomes nonuniform. In case of an inverter of a three-phase neutral clamp type, there is a problem in that a current (in of FIG. 10) flowing to the voltage dividing point of a capacitor is imbalanced and the intermediate potential of the capacitor is increased and greatly gets out of ½ of a DC bus voltage. However, having a configuration as described in this invention, the PWM carrier at time of a cancellation starts from an ascending pattern if the PWM pulse to be output enters the current limiting operation during the descending period of the PWM carrier, while the PWM carrier at time of the cancellation starts from a descending pattern, which is the reversed PWM carrier pattern of the previous one, if the PWM pulse enters the current limiting operation during the ascending period of the PWM carrier. Consequently, the PWM pulse to be output is always made uniform on such a condition that the current limiting operation and the cancellation are repeated, and a voltage on the voltage dividing point of the capacitor can be prevented from considerably fluctuating.

In FIGS. 5(a) and 5(b), time periods from a time that the overcurrent detector 12 has a normal value again to the cancellation of the current limitation are different from each other.

Next, a fourth embodiment of the invention will be described with reference to the drawings.

FIG. 6 is a diagram showing a PWM pulse according to the fourth embodiment of the invention.

FIG. 7 is a diagram showing an example in which the current limitation operating point of the PWM pulse illustrated in FIG. 6 is different.

FIGS. 6(a) and 7(a) show a PWM pattern (corresponding to one phase) according to the fourth embodiment, and FIGS. 6(b) and 7(b) show the actual switch driving signal waveforms of S1 to S4.

Although FIGS. 6 and 7 illustrate only the PWM pattern for one phase, all phases output the same voltage during a current limitation. In FIG. 6, a current limiting operation starts and outputs an intermediate voltage of a zero voltage period. Thereafter, if a PWM carrier is descending pattern in a next PWM update timing, then "a zero voltage period having an intermediate voltage which is equal to or shorter than a dead time"—"a positive zero voltage period"—"the zero voltage period having the intermediate voltage which is equal to or shorter than the dead time" is output. On the contrary, if the PWM carrier is ascending pattern as shown in FIG. 7, then "the zero voltage period having the intermediate voltage which is equal to or shorter than the dead time"—"a negative zero voltage period"—"the zero voltage period having the intermediate voltage which is equal to or shorter than the dead time" is output. During a current limiting period, thus, the ON/OFF times of S1 and S2, and S3 and S4 have a difference which is an almost double of the dead time, and they are almost equal to each other. Consequently, the conduction losses of the switch elements S1 to S4 are almost equal to each other so that the S2 and S3 can be prevented from being broken by heat.

Moreover, the zero voltage period having the intermediate voltage is equal to or slightly shorter than the dead time. Therefore, a short pulse in an equal time to the dead time which is generated in the cancellation of the current limiting operation is suppressed by the action of a dead time generating circuit. When a pulse which is equal to or slightly shorter than the dead time is suppressed, thus, it is possible to prevent some of the switching elements from being extremely increased the number of switching operations with repeating the operation of the current limiting operation and the cancellation. Consequently, it is possible to prevent the switch element from being broken due to the over heat caused by the switching loss.

Contrary to this example, after outputting an intermediate voltage of a zero voltage period, and if a PWM carrier is ascending pattern in a next PWM update timing, then "a zero voltage period having an intermediate voltage which is equal to or shorter than a dead time"—"a positive zero voltage period"—"the zero voltage period having the intermediate voltage which is equal to or shorter than the dead time" is output. On the contrary, if the PWM carrier is descending pattern as shown in FIG. 7, then "the zero voltage period having the intermediate voltage which is equal to or shorter than the dead time"—"a negative zero voltage period"—"the zero voltage period having the intermediate voltage which is equal to or shorter than the dead time" is output. Also in this case, the same advantages can be obtained.

The zero voltage period generator 11 for carrying out the operation according to the invention is equivalent to the PWM generator 1 for outputting the same PWM pulses for three phases. Therefore, the PWM generator 1 can be also caused to have the function comparatively easily. In this case, the zero voltage period generator can be omitted and the invention can be implemented by a simpler circuit.

While the invention has been described in detail by referring to the specific embodiments, it is apparent to the skilled in the art that various changes and modifications can be made without departing from the spirit and scope of the invention.

The application is based on Japanese Patent Application (No. 2001-200843) filed on Jul. 2, 2001, and the contents thereof are incorporated by reference.

INDUSTRIAL APPLICABILITY

As described above, according to the invention, it is possible to obtain an advantage that a rapidly increased current can be suppressed instantaneously by only a simple switching device and a PWM pattern generator using a power converting apparatus having a PWM pulse generating method of an inverter provided with a zero voltage period in an overcurrent, and the control circuit of the inverter is inexpensive and a safety can be enhanced.

Furthermore, the current limiting operation is always cancelled on the lowest point of the PWM carrier when the current limiting operation starts in the case in which the triangular wave of a PWM carrier is brought down from a vertex, and is always cancelled on the vertex of the PWM carrier when the current limiting operation starts in the case in which the triangular wave is raised from the lowest point. Thus, the PWM pattern is switched in the cancellation of the current limiting operation according to the PWM pattern in which the current limiting operation starts. Consequently, it is possible to obtain an advantage that a neutral potential can be prevented from fluctuating due to the nonuniformity of the PWM pulse.

In addition, the zero voltage period to have the intermediate voltage to be applied immediately before the output of a normal PWM pulse is equal to or shorter than the dead time. Therefore, the conduction losses of the switch elements are equal to each other and the switch element can be prevented from being broken due to heat.

The invention claimed is:

1. A power converting apparatus comprising a capacitor connected in series which serves to divide a DC voltage, a positive side main switching element and a positive side auxiliary switching element which have three electric potentials for setting the DC voltage to be a positive voltage, a negative voltage and an intermediate voltage by utilizing a node of the capacitor, and are inserted between the positive voltage side and an output terminal connected to a load and are connected to each other in series, a negative side main switching element and a negative side auxiliary switching element which are inserted between the negative voltage side and the output terminal and are connected to each other in series, a clamp diode connected between the intermediate voltage point and a node of the positive side main switching element and the positive side auxiliary switching element and between the intermediate voltage point and a node of the negative side main switching element and the negative side auxiliary switching element, and a plurality of free wheel diodes which is connected in parallel with each of the switching elements, and having, in a plurality of phases, a PWM inverter bridge for converting the DC voltage into an AC phase voltage having three electric potentials, wherein there is provided a zero voltage period having an intermediate voltage in which output phase voltages having all phases of the power converting apparatus become the intermediate voltage when a load current reaches a first overcurrent level.

2. The power converting apparatus according to claim 1, wherein three periods having a positive zero voltage period in which the output phase voltages having all the phases of the power converting apparatus become the positive voltage, a negative zero voltage period in which the output phase voltages having all the phases of the power converting apparatus become the negative voltage, and a zero voltage period having the intermediate voltage are selected and output alternately after the zero voltage period.

3. The power converting apparatus according to claim 2, wherein a transition from the positive zero voltage period to the negative zero voltage period and a transition from the negative zero voltage period to the positive zero voltage period are prohibited.

4. The power converting apparatus according to claim 1, wherein a reset to a normal PWM pulse is carried out when a load current is more than the first overcurrent level and is then less than the first overcurrent level.

5. The power converting apparatus according to claim 4, wherein a zero voltage period having the intermediate voltage is always output immediately before the normal PWM pulse is output.

6. The power converting apparatus according to claim 5, wherein a time of the zero voltage period having the intermediate voltage to be output immediately before the output of the normal pulse is set to be equal to or shorter than a dead time.

7. The power converting apparatus according to any of claims 4 to 6, wherein a pattern of the normal PWM pulse after the reset is switched corresponding to a PWM pulse when the load current reaches the first overcurrent level.

* * * * *